(12) United States Patent
Hess

(10) Patent No.: US 7,131,336 B2
(45) Date of Patent: Nov. 7, 2006

(54) PRESSURE TRANSMITTER INSTALLATION IN A PROCESS LINE OF A PROCESS FACILITY

(76) Inventor: Martin Hess, Prinz-Eugen-Strasse 11, 85051 Ingolstadt (DE)

( * ) Notice: Subject to any disclaimer, the term of this patent is extended or adjusted under 35 U.S.C. 154(b) by 172 days.

(21) Appl. No.: 10/486,476

(22) PCT Filed: Aug. 1, 2002

(86) PCT No.: PCT/EP02/08576

§ 371 (c)(1), (2), (4) Date: Jun. 15, 2004

(87) PCT Pub. No.: WO03/014691

PCT Pub. Date: Feb. 20, 2003

(65) Prior Publication Data

US 2004/0231427 A1 Nov. 25, 2004

(30) Foreign Application Priority Data

Aug. 10, 2001 (DE) .............................. 101 39 562

(51) Int. Cl. *G01L 7/10* (2006.01)

(52) U.S. Cl. ..................................... 73/729.2

(58) Field of Classification Search ................... 73/756, 73/714, 729.2
See application file for complete search history.

(56) References Cited

U.S. PATENT DOCUMENTS 6,301,969 B1 * 10/2001 Hess ............................. 73/756
6,463,806 B1 * 10/2002 Lung et al. ................... 73/756

* cited by examiner

*Primary Examiner*—Jewel V. Thompson
(74) *Attorney, Agent, or Firm*—McNair Law Firm, P.A.

(57) ABSTRACT

A flow control unit having a housing with a valve chamber. The valve chamber has an inlet and an outlet. The inlet of the valve chamber is placed in communication with the process circuit. A valve member is carried within the valve chamber. The valve member has an open position for allowing flow from the inlet of the valve chamber to the outlet of the valve chamber, and a closed position for preventing flow through the valve chamber. A pressure cell is disposed adjacent the outlet of the valve chamber. A closed pressure circuit is defined from the valve inlet, the valve chamber, and the valve outlet. A pressure sensor is disposed in the pressure cell and traverses the circuit at the outlet for measuring the pressure of the process circuit communicated through the closed pressure circuit when the valve member is in the open position.

18 Claims, 2 Drawing Sheets

PRESSURE TRANSMITTER INSTALLATION IN A PROCESS LINE OF A PROCESS FACILITY

BACKGROUND OF THE INVENTION

1. Field of the Invention

The present invention relates to a pressure transducer assembly for measuring the pressure in a process circuit of a process plant.

2. Description of Related Art

In process plants, such as chemical and refining plants, pressure transducers installed on the site are used as field instruments to measure fluid pressure. Pressure transducers are used for example to measure the fluid pressure and to detect the extent that the process circuit is full of fluid. Measuring diaphragms with differential pressure transducers are frequently used to ascertain the fluid flow in the circuit.

A known pressure transducer assembly of this type for use on a process circuit of a process plant is disclosed in German patent DE 199 21 172 C1. The pressure transducer assembly comprises a pressure transducer carried on a valve block. A fluid line is disposed between a process circuit and the valve block. A flow control unit in the form of a stop valve is installed between the process circuit and the valve block. A first flange connection is provided between the connection on the process circuit and fluid line. A second flange connection is provided between the valve block of the pressure transducer and the fluid line. The fluid line runs through the stop valve upstream of the valve block. The stop valve is connected to the process circuit at an input side downstream of the process circuit flange connection which operates as a first portion of the fluid line. The stop valve has a chamber in which a movable valve member is received. It can be moved from a flow-through position, in which a flow-through connection is established from the input side of the stop valve before to the valve block of the pressure transducer following the valve member of the stop valve, and into a closing position in which the flow-through connection is closed. Along the fluid line in the pressure transducer, a pressure cell with a pressure sensor is installed, whereby the pressure sensor is connected to an electronic measuring system for indicating the pressure of the process circuit when fluid is directed through the stop valve and into the valve block.

In order to reduce the cost of the installation, this typical pressure transducer assembly is connected directly into the process circuit whereby the short and stable interconnected components of the pressure transducer assembly take on a support function. The stop valve, which may be, for example, in the form of a ball valve or tap cock, is connected to numerous valve blocks on the downstream side to which transducer bodies, and with them the measuring cells contained therein and the housing of the electronic measuring systems are in turn connected. In a differential pressure transducer assembly of this type, and also known from DE 199 21 172 C1, two parallel fluid pressure measuring circuits, each with an associated stop valve and each with a downstream valve block to a differential pressure transducer are installed.

This known and expensive connection of one stop valve for each valve block, linked one after the other in a sequential manner in a circuit is necessary to make it possible to carry out manipulations on a given pressure transducer, such as for maintenance or transducer replacement, as well as to manage the pressure conditions downstream of a locked stop valve, as well as media-caused problems such as in the presence of toxic media. In addition, selected stop valves can be opened in dead spaces in order to achieve targeted pressure reduction in a known manner after the closing of an upstream stop valve when process pressure still prevails. However, these dead spaces downstream of the closed stop valve may also cause problems, for example, with respect to a temperature expansion or sterility of media residues remaining therein, so that such dead spaces may possibly prove costly to rinse out and must be sterilized e.g. for food production.

Accordingly, it is an object of the present invention to further develop a pressure transducer assembly of this type in such manner that the installation becomes more economical and compact and so that the above-mentioned disadvantages may not occur or at least be reduced to a great extent.

SUMMARY OF THE INVENTION

The above objectives are accomplished according to the present invention by providing a pressure transducer assembly for measuring the pressure in a process circuit of a process plant comprising a flow control unit having a housing with a valve chamber. The valve chamber has an inlet and an outlet. The inlet of the valve chamber is placed in communication with the process circuit. A valve member is carried within the valve chamber. The valve member has an open position for allowing flow from the inlet of the valve chamber to the outlet of the valve chamber, and a closed position for preventing flow through the valve chamber. A pressure cell is disposed adjacent the outlet of the valve chamber. A closed pressure circuit is defined from the valve inlet, the valve chamber, and the valve outlet. A pressure sensor is disposed in the pressure cell and traverses the circuit at the outlet for measuring the pressure of the process circuit communicated through the closed pressure circuit when the valve member is in the open position. Accordingly, additional valves are omitted and the pressure cell is located directly behind the valve member at the valve chamber outlet to minimize dead space directly following the valve member.

Since the pressure cell is positioned directly downstream of the valve member and valve outlet, it is essentially integrated into the flow control unit and only one valve member is used per closed pressure circuit. Thus, the pressure transducer assembly can be produced more economically thanks to the omission of additional stop valves/flow control units and valve blocks carrying the pressure transducer. Furthermore the overall assembly is light in weight, so that when it is mounted directly on a process circuit, only a relatively low supporting force is required. This also applies when the process circuit is connected via a process circuit connection flange to the process circuit.

Due to the direct integration of the pressure cell into the flow control unit, dead spaces can be minimized to such an extent that they can be disregarded without any problem for the functioning of the pressure transducer assembly. As a result, a valve block on the downstream side of a stop valve can be dispensed, and the problems and necessary work associated with the conventional, relatively large dead spaces are eliminated and thus do not occur. Such minimization or also omission of dead spaces is especially advantageous with toxic materials and with media that must be kept sterile. Other required rinsing and sterilization operations can be advantageously omitted. The problems of temperature expansion in dead spaces is also eliminated.

So-called known ball valves or tap cocks can be used in the flow control unit as they are well suited for the integration of the pressure cells immediately after the valve member.

In a preferred embodiment, the pressure cell is included in a detachable cover element mounted to the housing over the outlet of the valve chamber. Thereby the pressure sensor can simply be inserted into the pressure cell and can be mounted, being also easily accessible for possible maintenance or replacement after detaching the cover element.

A conventional pressure membrane installed directly and transversely after the valve member can be used as the pressure sensor in order to minimize dead spaces. Deformation of and/or strain of the pressure membrane by an applied process pressure is converted into an electric measurement signal and is processed further in the connected electronic measuring system. The electronic measuring system is advantageously contained in an electronics housing connected to the flow control unit to constitute a compact unit. Preferably, the electronics housing is carried by the detachable cover, so that the electronics housing constitutes one unit for assembly together with the measuring electronics, the covering element and a connected or connectable pressure sensor.

The above-described pressure transducer assembly can also be designed as a differential pressure transducer assembly with the same characteristics and measures as detailed above. For this purpose, two closed pressure circuits are provided, each with an associated flow control unit and each with a valve member in at least one housing of a flow control unit. A differential pressure cell is integrated with a differential pressure sensor and disposed between two closed pressure circuits directed towards each other with minimized dead space following the valve members and leading to the pressure cell, whereby each of the two closed pressure circuits leads to one side of the differential pressure sensor. Thereby the advantages described earlier regarding a pressure transducer assembly also apply to the differential pressure transducer assembly.

A circuit layout that is advantageous for compact design is achieved with the two closed pressure circuits running parallel to each other from the process circuit in at least one housing of a flow control unit. The closed pressure circuits starting at a connection flange on the process circuit are brought together in an arc with intercalation of the respective valve members, each ending at one side of the differential pressure sensor at the central differential pressure cell.

Simple assembly and possible subsequent easy access to the differential pressure sensor is achieved wherein the housings of two separate flow control units are provided, and wherein the housings are adapted for adjoining to each other in the region of the central differential pressure cell and capable of being separated from each other.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

DETAILED DESCRIPTION OF A PREFERRED EMBODIMENT

Figure 1:
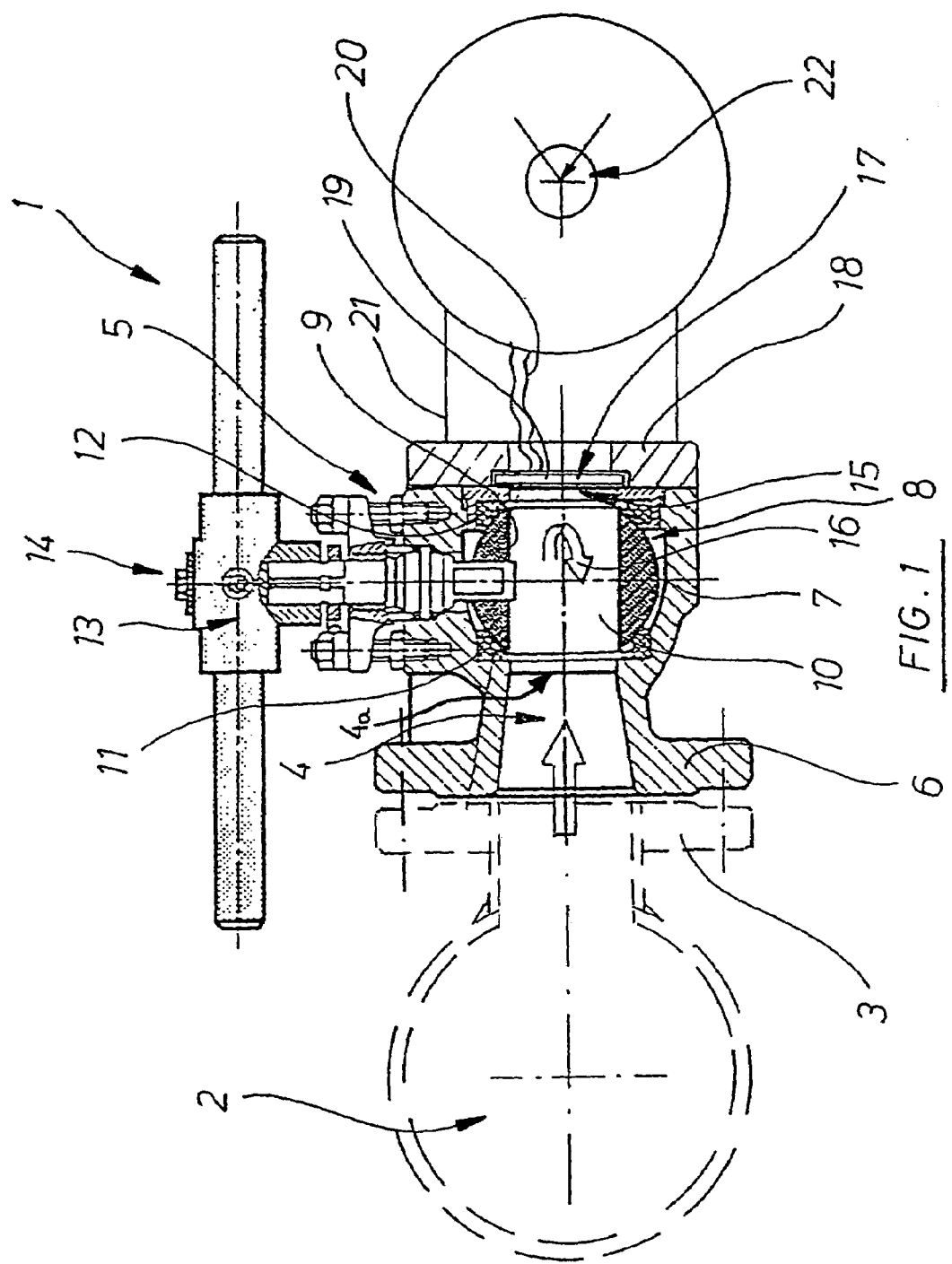
FIG. 1 shows a schematic section through a pressure transducer assembly on a process circuit of a process plant.

With reference to the drawings, the invention will now be described in more detail. FIG. 1 schematically shows a cross-section through a pressure transducer assembly 1 on a process circuit 2, shown here only schematically and by broken lines, of a process plant.

This pressure transducer assembly comprises in this case e.g. a process circuit connection flange 3 on the side of the process circuit, followed by a closed pressure circuit 4 formed in housing 7 of flow control unit 5 by valve chamber 8, inlet 4a, and outlet 15. A valve member 9, shown by way of example as a ball valve is installed in the pressure circuit 4 and is in fluid communication via flow control unit connection flange 6 to the process circuit at connection flange 3. The ball valve is carried within valve chamber 8 in housing 7. Preferably, valve member 9 includes a passageway forming a flow-through opening 10 that that can be selectively positioned to allow flow through closed process circuit 4. The valve member 9 is sealed against housing 7 in valve chamber 8 by means of seals 11, 12.

As can furthermore be seen in FIG. 1, flow control unit 5 further includes an actuating lever 13 connected to the ball valve member 9 in such a manner that the latter can be moved from an open flow-through position 14 shown in FIG. 1 in which a flow through connection is established from inlet 4a of valve chamber 8 to outlet 15 downstream of valve member 9, into a closed position indicated in FIG. 1 by arrow 16 but not shown, in which the flow-through connection is accordingly closed.

It can furthermore be seen in FIG. 1 that a pressure cell 17, installed in the closed pressure circuit 4, is integrated into housing 7 at outlet 15 of valve chamber 8 with minimum dead space directly following ball-shaped valve member 9.

The end of outlet 15 is made in the form of a pressure cell and is produced by means of a detachable cover element 18, whereby a pressure sensor in form of a pressure membrane 19, is located directly and transversely downstream of the flow-through opening 10 of valve member 9.

The pressure membrane 19 is connected in the usual manner via a corresponding circuit 20 to an electronic measuring system 22 contained in an electronics housing 21 and shown here only schematically.

The electronics housing 21 is furthermore connected to the detachable cover element 18 of the measuring cell, and this is also shown schematically only for purposes of an example.

Figure 2:
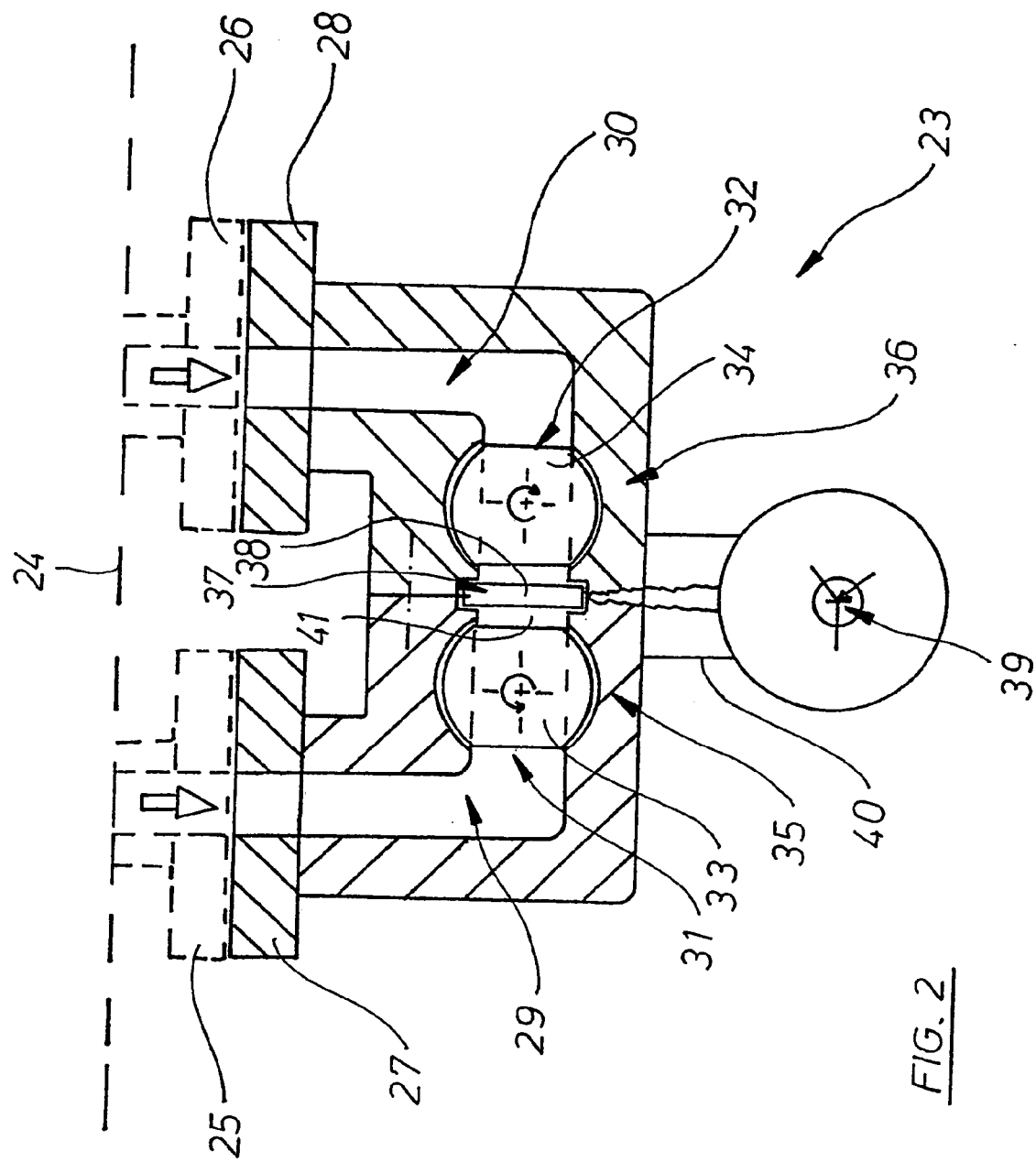
FIG. 2 shows a schematic cross-section through a pressure transducer assembly designed as a differential pressure transducer assembly on a process circuit of a process installation.

FIG. 2 shows an alternative embodiment in which a pressure transducer assembly is designed as a differential pressure transducer assembly 23. A process circuit 24 is here connected via two process circuit connection flanges 25, 26, also shown merely schematically and by broken lines as is the process circuit 24, to a flow control connection flange 27, 28 of each of two downstream closed pressure circuits 29, 30.

Each closed pressure circuit 29, 30 is assigned a flow control unit 31, 32, each with a valve member 33, 34 in the form of a ball valve, for example, in a valve chamber of housing 35, 36 of the flow control unit.

As can further be seen in FIG. 2, the two closed pressure circuits 29, 30 are parallel, starting at the flow control unit connection flange 27, 28 and are then brought towards each other with intercalation of the ball shaped valve member 33, 34, whereby a differential pressure cell 37 is integrated with a pressure membrane 38 in form of a differential pressure sensor into an outlet 41 of the two closed pressure circuits 29, 30, with minimum dead space downstream of the two ball-shaped valve members 33, 34 of the flow control units 31, 32. In this case the two closed pressure circuits 29, 30 end on either side of the pressure membrane 38 at the central differential pressure cell 37.

The two flow control unit housings 35, 36 adjoin each other here in the region of the differential pressure cell 37 and are connected in a detachable manner to each other. Here too, the pressure membrane 38 is coupled to an electronic measuring system contained in an electronics housing 40 that can be connected to the housings 35, 36, and this is also shown schematically in FIG. 2 for purposed of example.

While a preferred embodiment of the invention has been described using specific terms, such description is for illustrative purposes only, and it is to be understood that changes and variations may be made without departing from the spirit or scope of the following claims.

What is claimed is:

1. A pressure transducer assembly for measuring the pressure in a process circuit of a process plant, said pressure transducer comprising:
    a flow control unit having a housing with a valve chamber, said valve chamber having an inlet and an outlet;
    said inlet of said valve chamber in communication with said process circuit;
    a valve member carried within said valve chamber, said valve member having an open position for allowing flow from said inlet of said valve chamber to said outlet of said valve chamber, and a closed position for preventing flow through said valve chamber;
    a pressure cell disposed adjacent said outlet of said valve chamber;
    a closed pressure circuit defined from the valve inlet, said valve chamber, and the valve outlet;
    a pressure sensor disposed in said pressure cell for measuring the pressure of said process circuit communicated through said closed pressure circuit when said valve member is in said open position;
    said outlet is directly downstream of said valve member, and said pressure sensor is directly downstream of said outlet so that minimum dead space is provided between said valve member and said pressure sensor.

2. The pressure transducer of claim 1 wherein said pressure sensor comprises a pressure membrane extending traversal across said closed pressure circuit at said outlet.

3. The pressure transducer of claim 2 wherein said pressure cell is included in a detachable cover element mounted to said housing over the outlet of said valve chamber.

4. The pressure transducer of claim 3 including an electronics housing mounted to said flow control unit carrying an electronic measuring system.

5. The pressure transducer of claim 4 wherein said electronics housing is carried by said detachable cover element.

6. The pressure transducer of claim 1 including a pair of flow control units each including a closed pressure circuit defined by a valve inlet, a valve chamber, and a valve outlet; each of said closed pressure circuits extending from said process circuit to a central differential pressure cell containing a differential pressure sensor downstream of said valve outlet for each of said flow control units.

7. The pressure transducer of claim 6 wherein each of said closed pressure circuits in said pair of flow control units extends parallel to the other from said process circuit and are then brought towards each other to end on opposite sides of said differential pressure sensor at said central differential pressure cell.

8. The pressure transducer of claim 7 wherein said paid of flow control units each include separate housing adapted for adjoining to each other in the region of said central differential pressure cell and are capable of being separated to provide access to said central pressure cell.

9. A pressure transducer assembly for measuring the pressure in a process circuit of a process plant, said pressure transducer comprising:
    a flow control unit having a housing with a valve chamber;
    an inlet included in said housing for providing fluid communication between said valve chamber and said process circuit;
    an outlet included in said housing in fluid communication with said valve chamber;
    a pressure sensor adjacent said outlet opposite said valve chamber and extending across said outlet; and,
    a valve member included in said valve chamber for controlling flow from said process circuit to said pressure sensor;
    said outlet is directly downstream of said valve member, and said pressure sensor is directly downstream of said outlet so that minimum dead space is provided between said valve member and said pressure sensor.

10. The pressure transducer of claim 9 including a closed pressure circuit defined from said inlet, valve chamber, and outlet; extending from said process circuit to said pressure sensor.

11. The pressure transducer of claim 9 wherein said valve member includes a passageway movable between an open position for allowing flow from said inlet of said valve chamber to said outlet of said valve chamber, and a closed position for preventing flow through said valve chamber.

12. The pressure transducer of claim 9 wherein said pressure sensor is carried in a pressure cell disposed adjacent said outlet of said valve chamber.

13. The pressure transducer of claim 12 wherein said pressure cell is included in a detachable cover element mounted to said housing over the outlet of said valve chamber.

14. The pressure transducer of claim 13 including an electronics housing mounted to said flow control unit carrying an electronic measuring system.

15. The pressure transducer of claim 14 wherein said electronics housing is carried by said detachable cover element.

16. The pressure transducer of claim 15 including a pair of flow control units each including a closed pressure circuit defined by a valve inlet, a valve chamber, and a valve outlet; each of said closed pressure circuits extending from said process circuit to a central differential pressure cell containing a differential pressure sensor downstream of said valve outlet for each of said flow control units.

17. The pressure transducer of claim 16 wherein each of said closed pressure circuits in said pair of flow control units extends parallel to the other from said process circuit and are then brought towards each other to end on opposite sides of said differential pressure sensor at said central differential pressure cell.

18. The pressure transducer of claim 17 wherein said paid of flow control units each include separate housing adapted for adjoining to each other in the region of said central differential pressure cell and are capable of being separated to provide access to said central pressure cell.

* * * * *